(No Model.) 2 Sheets—Sheet 1.

E. N. BOWEN.
GOVERNOR FOR STEAM ENGINES.

No. 350,970. Patented Oct. 19, 1886.

Witnesses:
Adolph Pessler
Frank C. Sturtevant

Inventor:
Edwin N. Bowen
per Hiram Blake
Attorney (No Model.) 2 Sheets—Sheet 2.

E. N. BOWEN.
GOVERNOR FOR STEAM ENGINES.

No. 350,970. Patented Oct. 19, 1886.

Witnesses:
Adolph Ressler
Frank C. Sturtevant

Inventor:
Edwin N. Bowen
per Hiram Blake
Attorney

United States Patent Office.

EDWIN N. BOWEN, OF FITZWILLIAM, NEW HAMPSHIRE.

GOVERNOR FOR STEAM-ENGINES.

SPECIFICATION forming part of Letters Patent No. 350,970, dated October 19, 1886.

Application filed May 22, 1886. Serial No. 202,908. (No model.)

*To all whom it may concern:*

Be it known that I, EDWIN N. BOWEN, a citizen of the United States, residing at Fitzwilliam, in the county of Cheshire and State of New Hampshire, have invented certain new and useful Improvements in Governors for Steam-Engines, of which the following is a specification, reference being had therein to the accompanying drawings.

The objects of my invention are, first, to produce a governor which will regulate and equalize the speed of an engine when under a greater or less pressure of steam or to maintain the required number of revolutions per minute, whether the engine is running at one-fourth or its full capacity; second, a governor which will regulate the throttle-valve with a steady and even motion at all times when at work without the spasmodic or jerking motion common to most governors; third, to provide a shut off attachment to my governor, whereby the steam may be entirely shut off from the cylinder in case of any derangement or breakage of the belt which runs the governor. I attain these objects by the mechanism illustrated in the accompanying drawings, in which—

Figure 1:
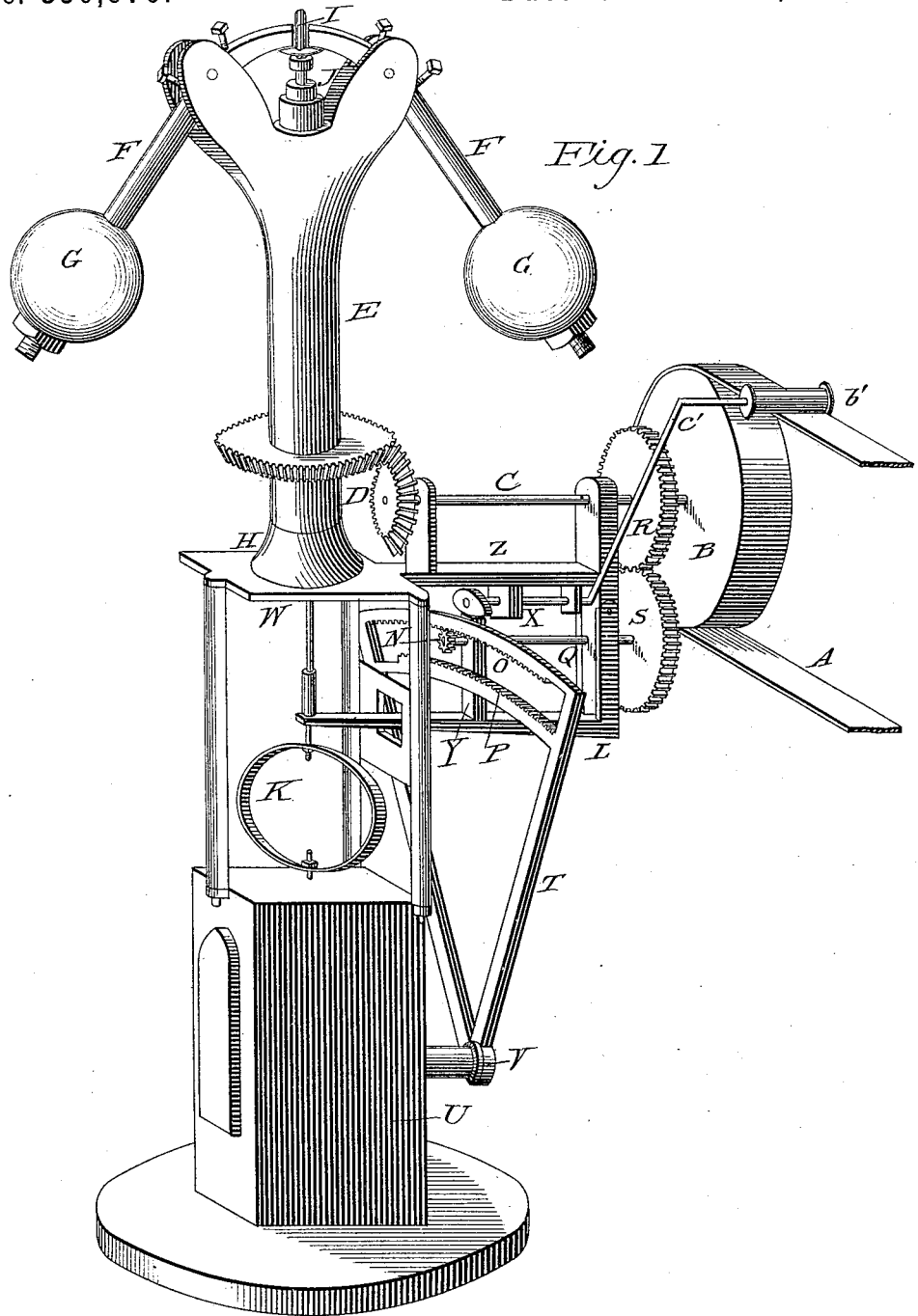
Figure 2:
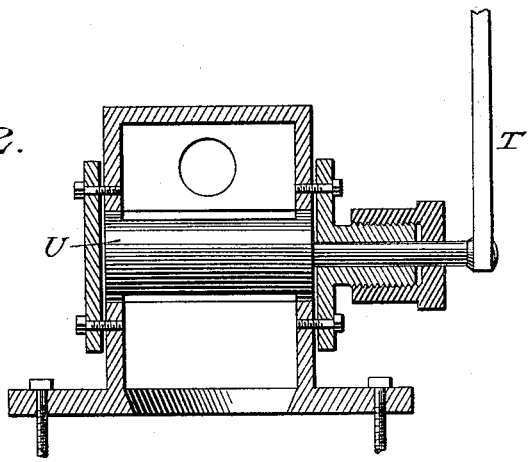
Figure 3:
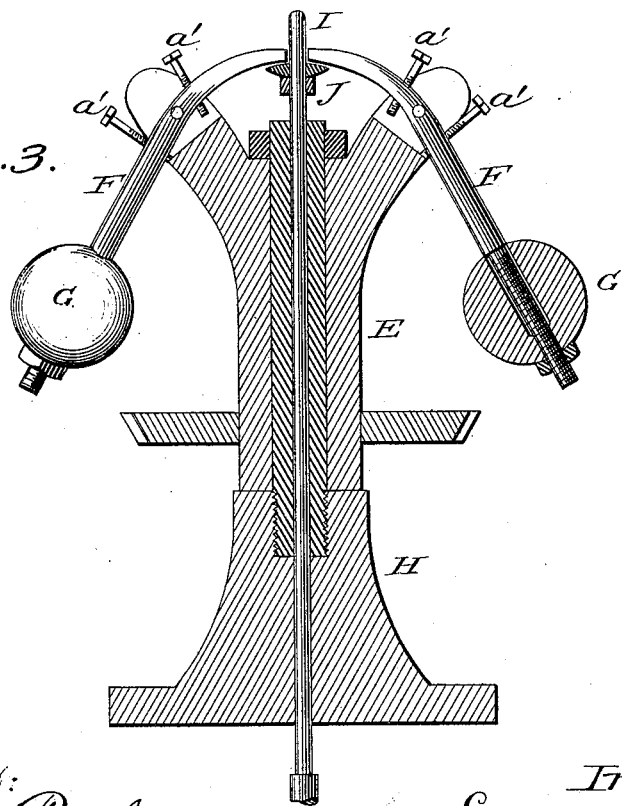

Figure 1 is a perspective view of the entire machine; Fig. 2, a vertical section of the steam-chest containing the throttle-valve, and lever arrangement for operating the same; Fig. 3, a vertical section showing the construction of the revolving sleeve, arms, and balls, and the spindle by means of which, with other appliances, the throttle-valve is operated.

Similar letters refer to similar parts throughout the several views.

The governor is operated by the belt A, running on the pulley B. From the driving-pulley B extends the shaft C, on the other end of which is the beveled gear D, which turns the revolving sleeve E, supporting the arms F F and balls G G. The sleeve E revolves on and around the base or standard H, which rests on the platform W. Through the center of the standard H runs the spindle I, provided at the top with the collar J, on which rest the ends of the revolving arms F F, and thereby force the spindle downward as the balls rise by the increase of speed. The lower end of the spindle I rests on the circular spring K, which is compressed as the spindle is forced down upon it, and when the balls fall by reason of decrease in speed the spring recoils and forces the spindle backward on the ends of the arms F F, so that the spindle moves up or down whenever the balls are raised or lowered.

On the lower part of the spindle I is attached the lever L, having its fulcrum at the bearing M, its weight at the gear N, and its power being the spindle I. The function of the lever L is simply to move the gear N upward or downward, so as to strike the gearing on the inside faces of the bars O and P. The gear N is mounted on the shaft Q, and is kept continually revolving while the machinery is in motion by means of power taken from the shaft C and communicated to the shaft Q by the gearing R and S.

The quadrant-shaped lever T is attached to the stem of the throttle-valve U in the steam-chest, as shown. It is constructed with two arms projecting from the stem V, which are surmounted by two geared bars, one above the other, in the form of a segment of a circle with its axis or center at V. One of these bars is placed above and the other below the movable gear N, the space between which is but slightly greater than the diameter of said gear, so that a slight downward movement of the spindle I, operating the lever L, will press the gear N against the gearing of the bar P and rapidly turn the lever T, partly close the throttle-valve, diminish the area of the steam-passage, and thus decrease the speed, and, vice versa, a slight upward movement of the spindle will instantly reverse the movement of the lever T and increase the speed to the required point. When the passage of steam is sufficient for the speed and power required, the gear N will revolve freely between the bars, and the throttle-valve will remain stationary. When more steam or power is required for the work of the engine, the balls fall, the spindle rises, connects the gear N with the upper bar, O, and the lever T moves forward and opens the throttle-valve until the required power is obtained. The lever T is then at rest. Thus my governor will maintain a uniform speed, whether running at one-fourth or its full capacity. By reason of the purchase obtained by the lever T, but slight power is required to move the throttle-valve, and this power, it will be observed, is obtained directly from the engine; hence the power imparted by the movement of the balls is employed solely to adjust the gear N, which moves the lever T. This arrangement renders the spindle I more sensitive than it would be, provided it acted directly on the throttle-valve, as in most governors.

My governor requires but a slight vertical movement of the balls G G to adjust the gear N, and this movement is graduated by means of the stop-bolts $a'$ $a'$ $a'$ $a'$, placed on the arms F F, which strike on bearings on the oblique posts on the sleeve E, as shown. The centrifugal force of the balls is also regulated by moving them up or down on the arms F F, as herein described.

On the lower end of the arms F F a screw-thread is cut of any required length. The balls G G are bored, and a screw-thread cut therein on about one-third the length of the bore, so as to fit the thread of the arm. An ordinary binding-nut follows the ball, and thus the balls are shifted on the arms as desired. By means of the two devices above described, the requisite speed of the engine or machinery is adjusted and maintained with certainty.

My shut-off arrangement is attached to the under side of the plate W, and consists of a shaft, X, on one end of which is affixed the cam Z, which is impingent on the top of the post Y on lever L. On the other end of the shaft X projects the arm $c'$, terminating in the anti-friction pulley $b'$, which runs on the driving-belt A. When the shut-off is thus adjusted on the belt A, the foot of the cam Z is raised, so that the gear N, having its bearing in the post Y, will vibrate freely between the bars O and P; but, in case the belt A should break, the pulley $b$ (by reason of the elbow-extension of the shaft X) falls, and its weight presses the foot of the cam Z on the top of the post Y, and bears the gear N on the bar P, and the momentum of the machine will close the throttle-valve and stop the engine, thus effectually preventing the engine from running under a full head of steam when the governor fails to work.

Having described my invention, I claim—

1. The combination, in an engine-governor, of the revolving sleeve E, provided with arms F F, movable balls G G, with the spindle I, circular spring K, lever L, and vibrating gear N, all substantially as set forth.

2. In a steam-engine governor, the combination of the revolving sleeve E, provided with arms F F, balls G G, the collar J, spindle I, circular spring K, lever L, vibrating gear N, lever T, and throttle-valve U, all constructed substantially as and for the purposes specified.

3. In a steam-engine governor, the combination of the check-bolts $a'$ $a'$ $a'$ $a'$ in the arms F F with the oblique arms of the sleeve E, substantially as set forth.

4. In a steam-engine governor, the balls G G, having a screw-thread on the lower part of the bore through the center, so as to move said balls up or down on the arms F F, constructed, as shown, for the purpose specified.

5. In a steam-engine governor, a shut-off attachment consisting of the cam Z, impingent on the post Y, shaft X, with the lever-elbow extension $c'$, on the end of which is attached an anti-friction pulley, $b'$, to run on the driving-belt of the governor, all constructed and operating substantially as and for the purpose set forth.

In testimony whereof I affix my signature in presence of two witnesses.

EDWIN N. BOWEN.

Witnesses:
  REUBEN L. ANGIER,
  LEANDER RICHARDSON.